D. IRWIN.
Earth-Scraper.
No. 168,334. Patented Oct. 5, 1875.
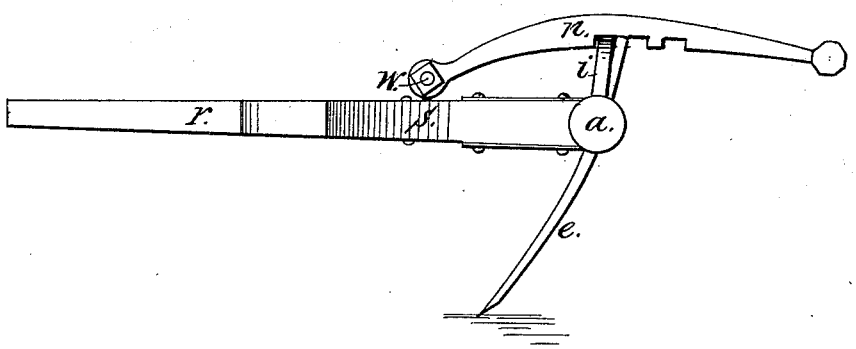
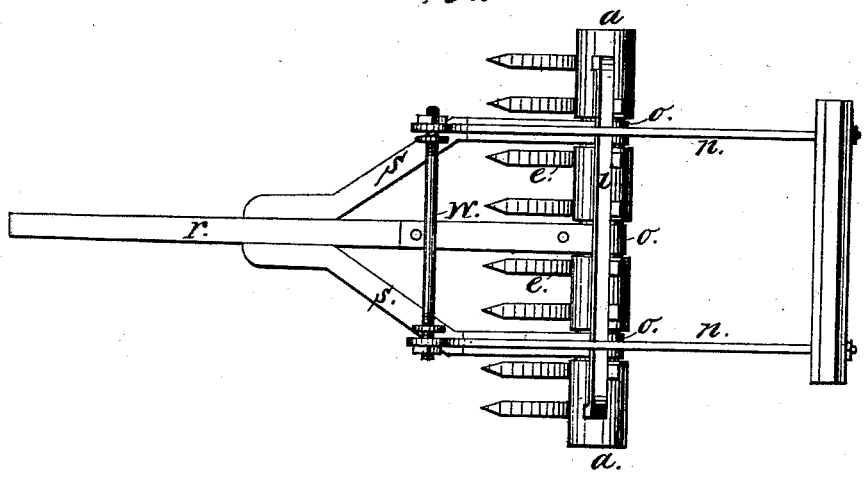
Witnesses:
Duke Wellington Irwin
Edwin A. Burlingame
Inventor:
David Irwin

UNITED STATES PATENT OFFICE.

DAVID IRWIN, OF BYRON CENTRE, MICHIGAN.

IMPROVEMENT IN EARTH-SCRAPERS.

Specification forming part of Letters Patent No. 168,334, dated October 5, 1875; application filed March 8, 1875.

*To all whom it may concern:*

Be it known that I, DAVID IRWIN, of Byron Centre, Kent county, Michigan, have invented a Ditcher and Earth-Remover, of which the following is a specification:

The object of my invention is an implement to be propelled by horse or other power, the teeth of which may be inserted in ground at any line, the earth in front moved to any other given line, and dropped instantaneously without dumping or other motion, except lifting the handles of the implement.

In the drawing, $a$ represents a head, through which teeth $e$ are inserted; $r$, the tongue, with hounds $s$, to which the team is attached. $o$ are circular hinges, attached to tongue and hounds, in which head $a$ revolves. The outer teeth $e$ are connected, forming head $i$, which fits in notches in handles $n$, to hold teeth at any desired angle with the ground to be removed. Handles $n$, with notches in each, are attached to hounds $s$ by means of rod or bolt $w$.

To operate the ditcher, the team being attached, the handles are raised, and head $i$ is turned forward till it rests against top of hounds and tongue, which leaves the points of the teeth inclined backward, in position to be drawn forward without obstruction. The ditcher is then moved to the desired line of the ditch; the team is backed up, which causes the head $a$ to revolve in hinges $o$ until teeth $e$ stand perpendicular, or at an inclination of any desired angle forward, and is held to its place by notches in handles $n$ catching head $i$. The team is started, and the earth removed by the teeth to opposite line of ditch; and, by simply raising the handles, so that head $i$ escapes from notches in handle $n$, the motion of the team and the weight of obstruction will cause the points of the teeth to move back to the first position described, the earth readily escaping, and the ditcher in position to be again moved to position for loading.

What I claim to have invented, and desire patented, is—

The above-described ditcher and earth-remover, having, in combination with tongue $r$ and head $a$, the hinges $o$, teeth $e$, head $i$, and notched handles $n$, substantially as and for the purposes set forth.

DAVID IRWIN.

Witnesses:
DUKE WELLINGTON IRWIN,
EDWIN A. BURLINGAME.